Oct. 6, 1931.   M. J. CALLAHAN   1,825,689

THERMAL CONTROL FOR DAMPERS FOR HEATING AND VENTILATING UNITS

Filed April 15, 1927   6 Sheets-Sheet 6

INVENTOR:
Michael J. Callahan
ATTORNEY.

Patented Oct. 6, 1931

1,825,689

UNITED STATES PATENT OFFICE

MICHAEL J. CALLAHAN, OF NEW YORK, N. Y.; ARTHUR V. DEARDON AND ELMER E. WIGG, EXECUTORS OF SAID MICHAEL J. CALLAHAN, DECEASED, ASSIGNORS TO PEERLESS UNIT VENTILATION CO. INC., OF BRIDGEPORT, CONNECTICUT

THERMAL CONTROL FOR DAMPERS FOR HEATING AND VENTILATING UNITS

Application filed April 15, 1927. Serial No. 184,023.

This invention relates to the art of heating and ventilating and, particularly, has reference to a mechanism for automatically controlling the mixing and recirculating dampers thereof so as to bring about, within the unit, certain modes of operation which will result in the control of the temperature of the air delivered into the room of installation during the active period of use of the unit and which will also regulate and control the operation of the unit during the inactive period of its use. My improved mechanism also makes my unit responsive, sensitively, to temperature variations and changes of the room of installation of the unit, so that the latter will perform as just stated.

The heating and ventilating "unit" is now almost universally in use for controlling the temperature of school-rooms, buildings, hotels, lecture halls and other fabrics and has, in the connections noted, practically supplanted the central fan or split systems. The unit system, on account of the many advantages thereof over the central fan system, has become established because of its economy, its ability to ventilate as well as heat and control the temperature of the room or space ventilated, and because of its flexibility of use and control, as compared with the control of the central fan and split systems which is brought about from a central station. Moreover, the unit system has greater simplicity, is more accurate in its work, is more definite in its functions, and is far more economical in installation and maintenance than the central fan and split systems, and has practically revolutionized the structure of buildings in which it is installed by the elimination of ducts, flues, wiring, machinery rooms, excavations, and great head room required in the use of the central fan and split systems.

In my application #124,883, filed July 26, 1926, I have disclosed a construction of heating and ventilating unit which is automatically controlled in all its functions, and which is self-contained, so as to eliminate the control of certain of its elements from a central or outside station. In said unit the structure is such that the pipings, conduits, wall grooves, compressed air plants, pumps and various other devices and means of the usual systems are eliminated; but, it is a great desideratum to make such units self-contained, automatically operating, simple in construction, certain in functions, and economical in operation and maintenance by the elimination or reduction of mechanical means, simplification thereof, and the use and application of devices and means such that the unit is reduced in cost to the minimum.

It is among the objects, therefore, of my invention, as hereinafter disclosed, to economize space in the room of installation by reducing to the minimum the size of the unit; to simplify the unit in order to bring about certainty in operation and functional results; to provide for economy in construction and maintenance; and to produce the functional results in a new, positive and simplified way, and by the use of the simplest form of elements possible.

With the above objects in view and others which will be detailed during the course of this description, my invention consists in the parts, features, elements and mechanisms and combinations thereof hereinafter described and claimed.

In order that my invention may be clearly understood, I have provided drawings wherein.

Figure 1:
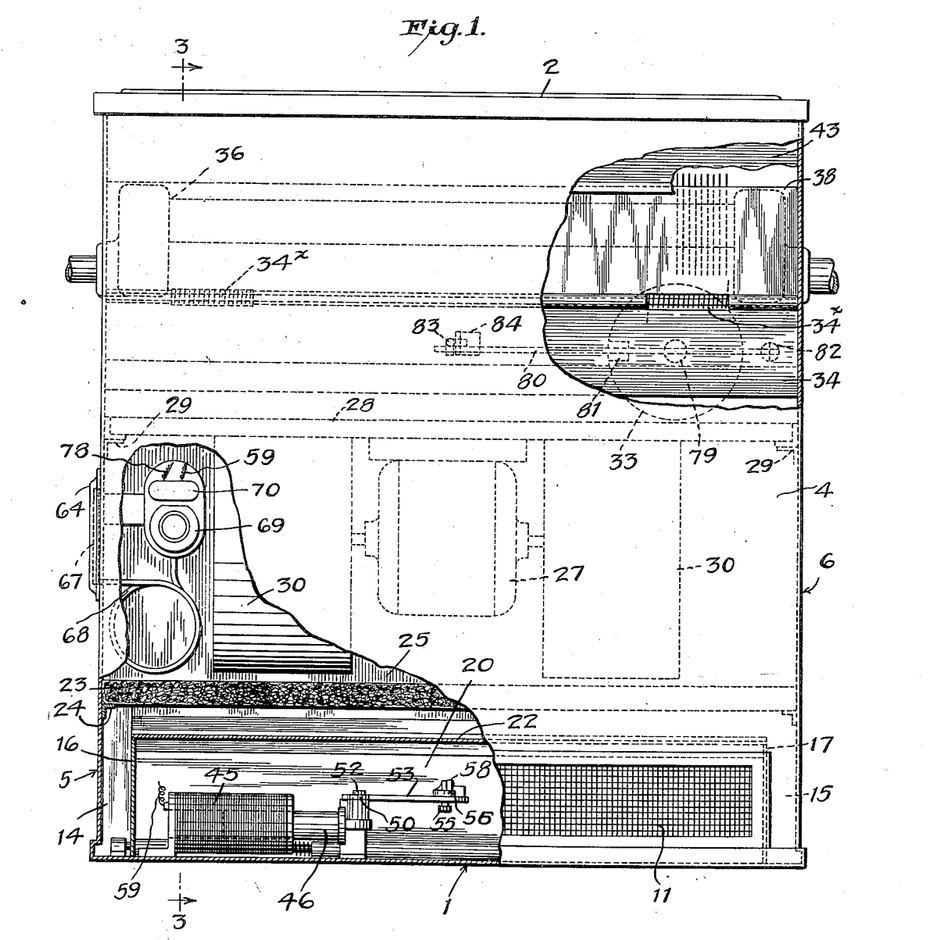
Figure 1 is a view in front elevation of a heating and ventilating unit embodying my invention, parts of the front wall of the casing being broken away to show details of construction.
Figure 2:
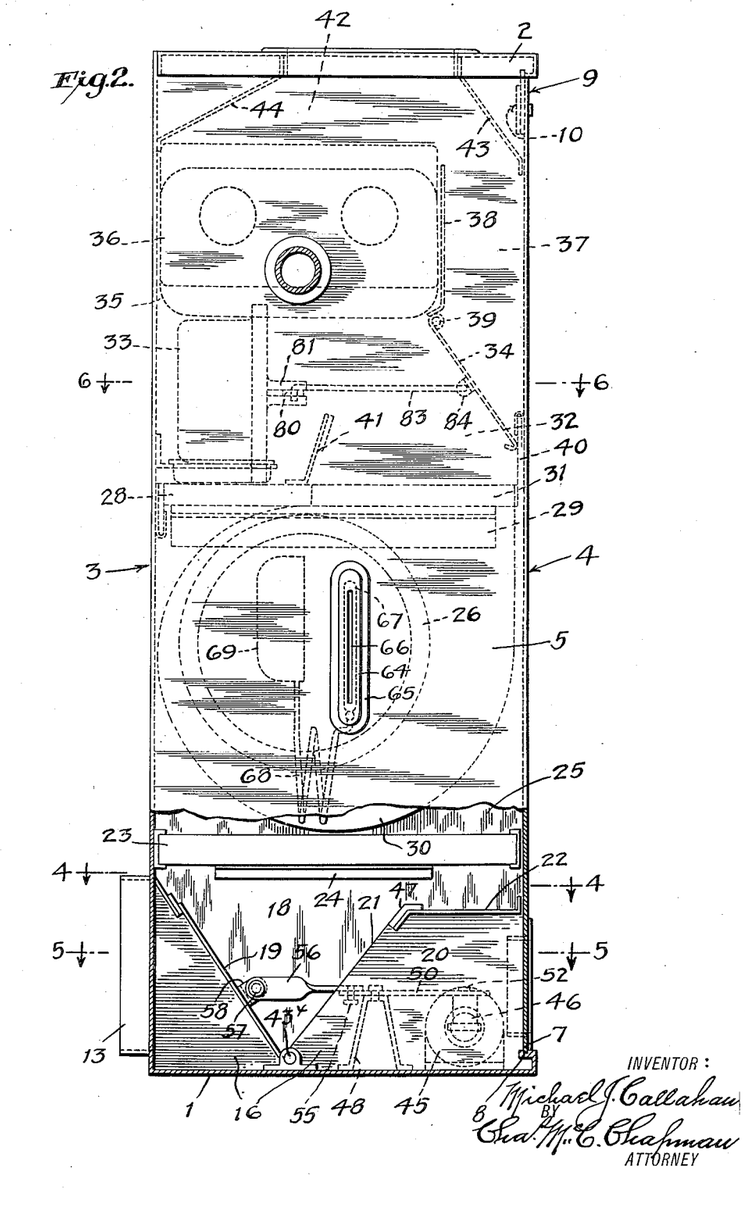
Figure 2 is a view in end elevation of the unit shown in Figure 1, a part of the lower portion of the end wall of the casing being broken away to show details of construction, this view showing the combined inlet and recirculating damper in one extreme position, and the mixing damper in one extreme position.
Figure 3:
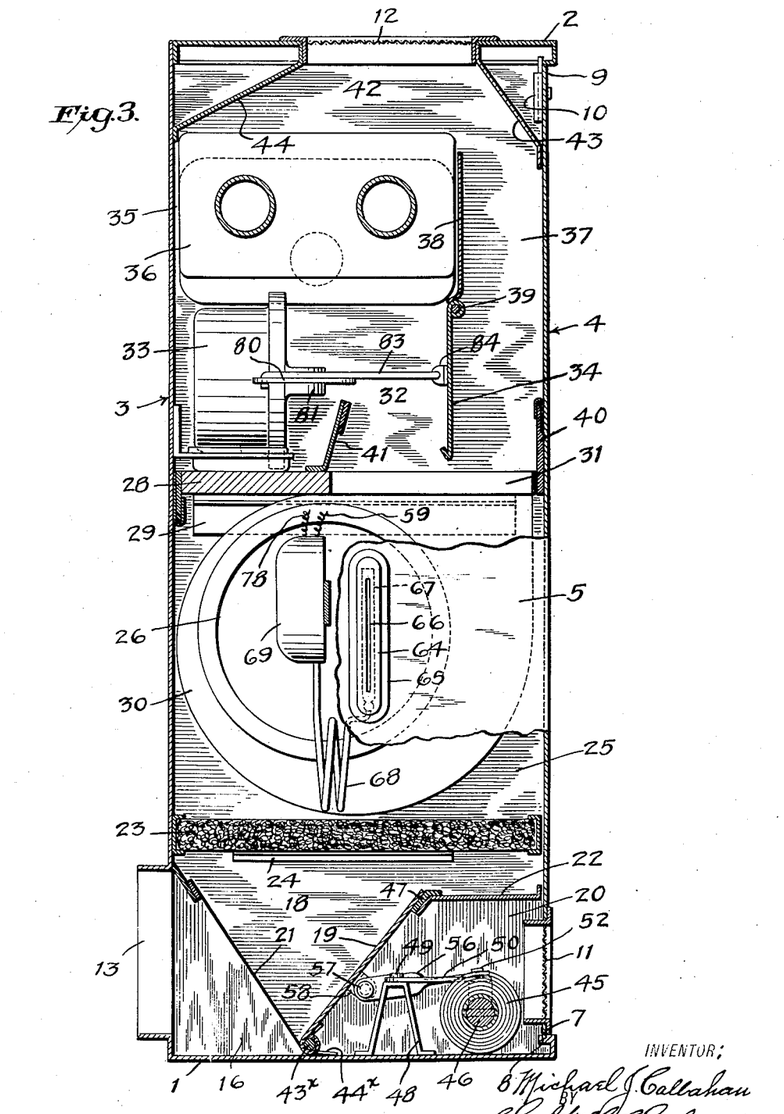
Figure 3 is a view showing the unit in vertical section substantially on the line 3—3 of Figure 1, looking toward the right end of the unit.
Figure 4:
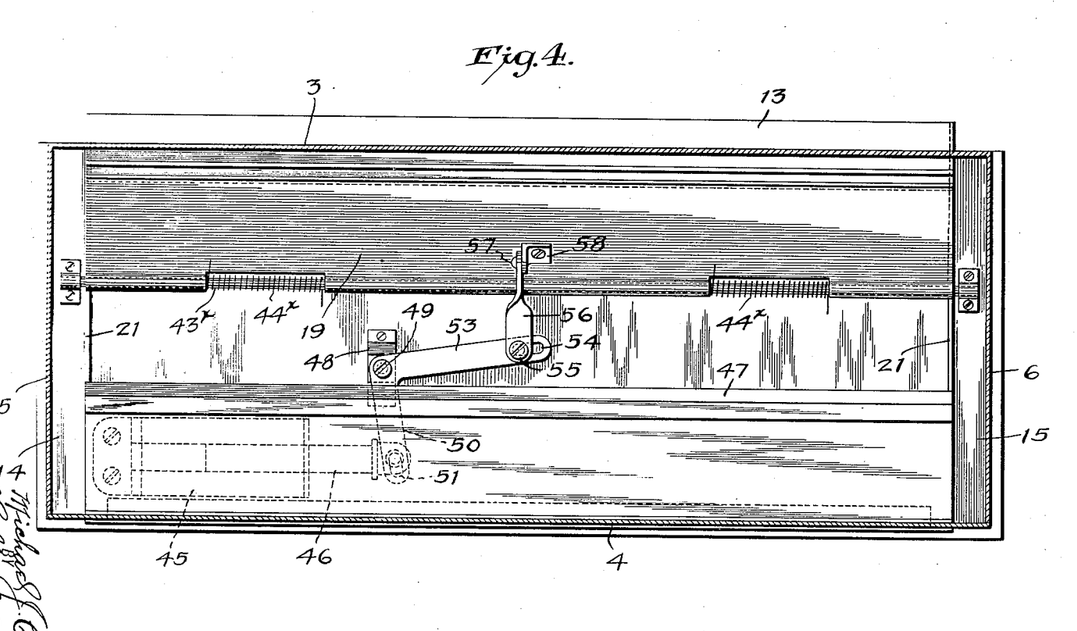
Figure 4 is a view showing the unit in horizontal section substantially on the line 4—4 of Figure 2, looking downwardly.
Figure 5:
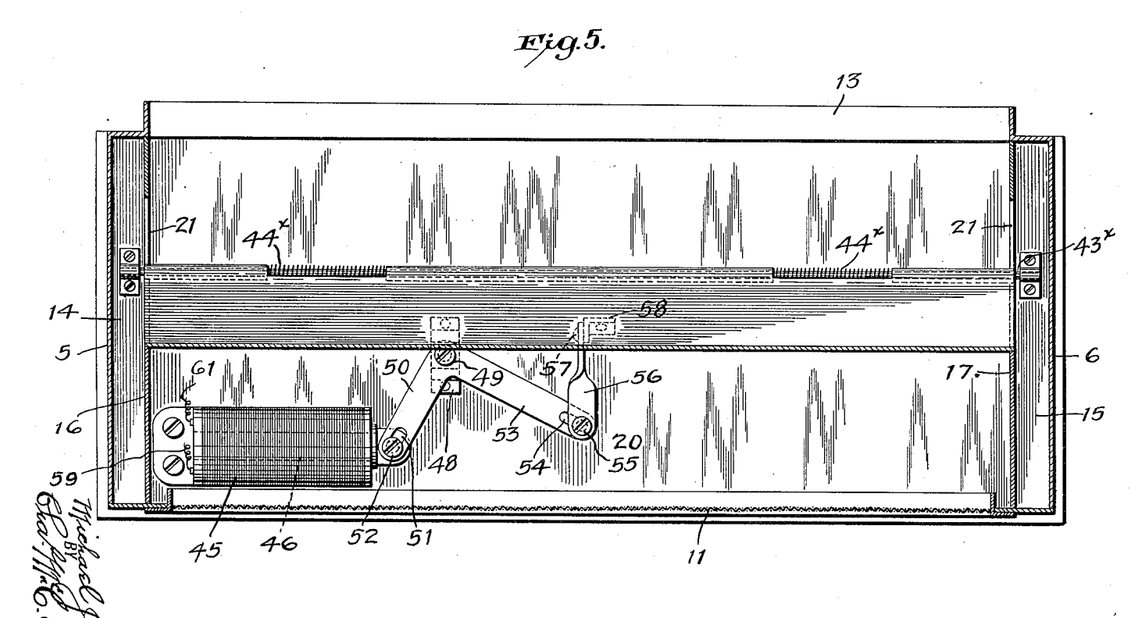
Figure 5 is a view similar to Figure 4, the section being taken on the line 5—5 of Figure 2, looking downwardly.
Figure 6:
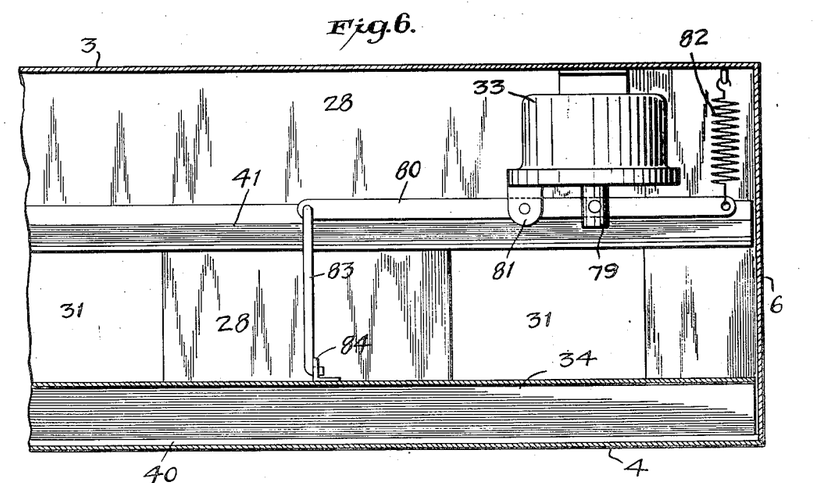
Figure 6 is a horizontal sectional view of a portion of the unit, the view being enlarged and taken on the line 6—6 of Figure 2, looking downwardly.

Referring to the drawings, and particularly to Figures 1 to 3, it will be seen that the casing of the unit has its interior partitioned to provide a plurality of chambers, flues or passages for a mode of operation and for functional purposes presently described. The casing is rectangular in form and its bottom is indicated at 1, its top at 2, its back at 3, and its front at 4. The opposite end members of the casing are indicated at 5 and 6. The front 4 of the casing is removable and is held in place by entering its lower edge 7 in a groove 8, formed in the bottom of the casing at the front thereof, and by securing the top 9 thereof by a locking or latching mechanism generally indicated at 10, and which may be of any form found convenient or desirable, see Figures 2 and 3. The bottom of the front member of the casing is provided with an inlet opening covered by a grille 11, through which the cold air, which seeks the floor, may be drawn for recirculating purposes. The top of the casing is provided with a discharge opening covered by a grille 12, through which the hot, cold or tempered air is discharged into the room of installation in a vertical jet. The back of the casing, at its bottom, is provided with an inlet 13 for the cold air which communicates with the outside of the building through the medium of flues or passages, as may be found convenient and which is controlled by the position of installation of the unit in the building. At opposite ends of the casing, see also Figures 1, 4 and 5, near the bottom, are two narrow chambers 14 and 15, which are closed by headers 16 and 17 to form the combined inlet and recirculating chamber 18, the functions of which are controlled by the inlet and recirculating damper 19. Herein, for brevity, the damper 19 and chamber 18 will be identified by the adjective "inlet". The actuating mechanism for the inlet damper is located in a front chamber 20, at the bottom of the casing, also formed by the headers 16 and 17, which are cut out in the center, as at 21, to allow movement of the damper 19. The top of the chamber 20 is closed by the member 22, and its front is formed by the lower portion of the casing member 4. The top of the inlet chamber 18 is defined by a filter 23 of viscous structure, so that the air, entering the unit, will be filtered before it is discharged from the top thereof. The filter is supported by end bars 24 secured to the ends of the casing. Above the filter there is a blower chamber 25, in which are located the blowers 26 and the motor 27, which operates the same. The blowers and motor are underslung from the board 28, supported by bars 29, secured to the ends of the casing. The blowers are enclosed by casings 30 forming ducts for the air drawn at the eyes of the blowers,—the latter being centrifugal in character,—and discharged through an opening 31 in the board 28. The top of the blower chamber 25 is defined by the board 28 which also defines the bottom of the cold air chamber 32, and affords a support for the sylphon motor 33 located at one end of said chamber 32, which is also called the mixing damper chamber, because the mixing damper 34 swings therein. Above the chamber 32 is the heating chamber 35 containing the heating element or radiator 36, and a by-pass chamber, passage or conduit 37, the heating and by-pass chambers being defined by the partition 38 and the back and front walls, respectively, of the casing. The heating element 36 is supported at its opposite ends on the end-walls of the casing in suitable manner; and the mixing damper 34 is hinged or pivoted at 39 to the partition 38, so as to freely swing in the chamber 32, which freely communicates with the heating and by-pass chambers. In its movements, the damper 34 contacts, at opposite extremes, with the padded members 40 and 41, and the motor 33 controls its movements between extremes. Above the heating and by-pass chambers is a hot air or mixing chamber 42, into which the hot air from the heating chamber is discharged, and into which the cold air is discharged through the by-pass chamber. The front and back walls of the mixing chamber are formed at an inclination by the provision of the front and back plates 43 and 44, respectively, so that the air passing from the heating and by-pass chambers is directed through the grille 12 in the top of the casing without impediment or retardation.

Figure 7:
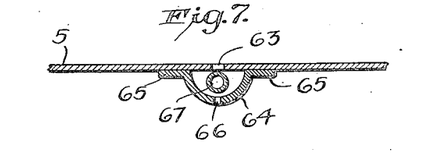
Figure 7 is a horizontal sectional view of a detail of construction showing the left end wall of the casing, the thermal tube and the cover or protector therefor.
Figure 8:
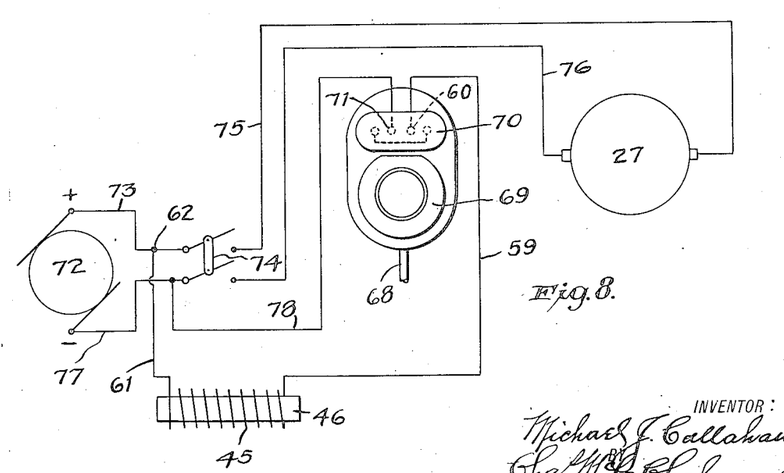
Figure 8 is a diagram of the wiring including the generator, the mains therefrom, the motor, the solenoid and a part of the thermal unit for controlling the switch which closes the circuit to the solenoid, and which thermal unit is connected to the thermal tube shown in Figure 7.

The inlet damper 19 is hinged or pivoted along its bottom 43× to the bottom of the casing and is normally held in position to close the cold air inlet through the medium of one or more springs 44× coiled about the hinge of the damper. The inlet damper is shifted from its normally closed position to the wide-open position shown in Figure 3 through the medium of an electromagnet 45 in the form of a solenoid, the central core or armature 46 of which is sucked inwardly when the magnet is energized. In its full open position, the damper 19 is at rest upon the abutment 47 which is a part of the housing member 22 for the solenoid and forms the top of the solenoid chamber. Within the recirculating chamber a bracket 48 has pivotally mounted thereon at 49 a bell-crank lever, one arm 50 of which has an elongated slot 51, through which extends a pivotal connection 52 to the outer end of the armature of the solenoid. The other arm 53 of the bell-crank lever is provided with an elongated slot 54, through which extends a pivotal connection 55 to the free end of a link 56, the opposite end of which is pivotally connected at 57 to an arm 58, rigidly secured to the inner side of the damper 19. The lead 59 of the coil of the solenoid extends to a contact 60, Figures 1, 3, 5, 8, and the lead 61 extends to a contact 62. The end casing wall 5 is provided with a narrow, elongated slot 63, Figure 7, extending vertically of the casing and approximately centrally disposed. Covering the slot is a convexed housing plate 64, the side flat members 65 of which are adapted to be secured to the casing member 5 on opposite sides of the slot, the plate being so arranged that its elongated slot 66 will accurately register with the elongated slot 63 in the casing member. Between the two slots is located a thermometric tube 67, which may contain either mercury or an expansive fluid susceptible to temperature. The tube 67, at its bottom, is connected with one end of a capillary coil 68, the opposite end of which communicates with an automatic controller for temperature and pressure of a well known type, indicated at 69, and which is only conventionally shown. This controller is known as the Tag Snapon, and its action is such as to operate under thermostatic conditions to quickly shift a switch at 70 to close the circuit between the two contacts 60 and 71, so as to energize the solenoid 45 and cause it to suck in its armature 46 and operate the bell-crank lever to swing the inlet damper 19 from the closed to the open position when the temperature conditions in the room of installation of the unit require the same. When the circuit is broken by the shifting of the switch at 70, under thermostatic control, the springs 44ˣ at the pivot of the damper 19 will shift the latter to its closed position, thus reversing the operation of the bell-crank lever and the armature of the magnet. Thus the admission of cold air to the unit is controlled, together with recirculation of the air of the room of installation through the unit. To better understand this operation, reference is made to the diagram of Figure 8, wherein the elements just described are indicated, and the motor 27 is shown in circuit with the generator 72, positive lead 73 from which extends through knife-switch 74, and lead 75 to the motor 27, the negative lead 76 extending from the motor back through the other side of switch 74 to the negative side of the generator through lead 77. Lead 61 extends from coil 45 to the positive lead 73 at contact 62, and lead 59 extends from coil 45 to the contact 60 of switch 70, and lead 78 goes from contact 71 to negative lead 77. Thus it will be seen that the solenoid is in a generator circuit independent of the motor, and that it can be operated whether the motor and blowers are in operation or not; also, that the solenoid is automatically operated thermostatically, while the motor 27 can be operated only by throwing switch 74.

The mixing damper 34 hinged or pivoted along its top is caused to perform its functions through the medium of a so-called sylphon 33, the structure and operation of which is well known in the art and which, under varying conditions of temperture, will operate to swing the mixing damper from one extreme to the other, and control the position thereof between the two extremes according to the temperature of the air passing through the unit, or of the air in the room of installation of the unit. The location of the sylphon is important, as will be presently described, and its plunger 79 connected to its flexible diaphragm is pivoted to a lever 80, which in turn in pivoted to an arm 81 on the frame of the sylphon, and which lever, at one end, is under control of a spring 82, one end of which is connected to the lever and the other end of which is connected to the back-plate of the casing. The opposite end of the lever is pivotally connected to one end of a link 83, the opposite end of which is pivotally connected to a fixture 84 on the mixing damper. Hence, when the fluid within the sylphon expands, the plunger will operate the lever to positively shift the damper in one direction and store up power in the spring by expanding the latter. When, however, the temperature changes and causes the fluid in the sylphon to contract, the plunger will withdraw and the spring will contract, thus causing the damper to be shifted in the opposite direction. Consequently, under varying conditions of temperature in the casing of the unit, and, consequently, under varying conditions of temperature in the room of installation of the unit, the mixing damper will be shifted to varying positions between the two extremes so as to regulate the passage of air from the cold air chamber 32, either wholly through the heating chamber or wholly through the by-pass chamber, or partly through the two chambers, so that the air may be mixed in the mixing chamber or the temperature of the air in the mixing chamber may be regulated before discharge through the grille 12 at the top of the casing. It should be noted that the chamber 32 receives the cold air directly from the duct of the casings 30, and that in passing to the heating chamber the air is deflected from both the damper 34 and its stop-plate 41, which latter is slightly inclined over the passage 31. Thus the cold air is diffused across the heating chamber and does not directly contact with the sylphon 33, being protected by the plate 41. However, an eddy of hot air from the heating chamber will surround the sylphon in the chamber, between the plate 41 and the back of the casing, and influence the sylphon for actuation of the mixing damper to secure the functions presently described. The sylphon may also be controlled by a thermostatic device such as, or similar to, that which controls the inlet damper.

In the use of the unit, the temperature in the room of installation is regulated and the unit is caused to automatically operate in the following manner:

It must be first understood that, during the course of a day's run under ordinary circumstances, as in heating a school-room, two important functional operations take place, with incidental control so as to regulate and maintain a predetermined temperature in the room of installation of the unit; that is to say, in a school-room approximately perfect ventilation is maintained and the temperature is maintained at approximately 70° F., and this condition is brought about by positioning the inlet damper at its extreme right, or toward the front of the casing, viewing Figure 3, which is the inlet position of said damper, and by controlling the operation of the mixing damper so as to permit the fresh air entering the inlet chamber 18 to be driven through the heating chamber, or the by-pass chamber, or partly through both said chambers, according to the requirements and the degree of temperature to be maintained in the room according to predetermination. From 9 a. m. to 4 p. m., this run of the unit is maintained so that fresh air is admitted, filtered, heated and discharged into the room of installation of the unit to supply the pupils with the proper amount of fresh air heated to the predetermined degree. After the day's run, and when the pupils have all been dismissed, it is unnecessary to maintain pressure on the radiators and it is also unnecessary to maintain the supply of fresh air through the unit to the room. Therefore, the engineer in the basement of the building reduces pressure on the radiators, and the temperature of the room will slowly and gradually drop to approximately 65° or less, for example. When this condition occurs, the inlet damper is released by the solenoid and its spring will cause the damper to be shifted over to closed position, which is the full line position at the left, viewing Figure 2. Simultaneously, this action of the damper clears the way for recirculation, and the mixing damper will have been shifted to the extreme right, viewing Figure 2, which is the wide-open position, permitting the air, admitted to the bottom of the unit, to pass entirely through the radiator and into the room. Thus, with the fresh air cut off, the unit will recirculate the air of the room because, as the air in the room cools, it will descend to the floor and, if the blowers are operating, will be sucked into the grille at the bottom of the unit and discharged through the heating chamber into the room, being directed in a vertical jet toward the ceiling thereof. This occurs when the temperature of the air in the room is approximately 65° F., and this condition is maintained throughout the night and until 8:30 in the morning, when it is desired to quickly raise the temperature of the room in anticipation of the coming of the pupils. If the blowers have been stopped by cutting off the electric current, viz., opening the switch 74, the recirculation through the unit will be by gravity, as is well understood, the operation being the same as if the blowers were active.

To produce a quick rise of temperature in the room, the pressure on the radiator is increased, the blowers are set in action, the active recirculation takes place, as before described, and, with the gradual rise of pressure on the radiators, the temperature of the air discharged into the room will be of gradually rising degree. This condition will continue until the temperature of the air discharged into the room through the unit approximates 71° or 72° F., whereupon the thermostatic controlling device 69 will be influenced to shift the switch at 70, and close the circuit to the solenoid 45, energizing the latter and causing its armature to be sucked in, thus actuating the bell-crank lever, which through the link to the inlet or recirculating damper will cause the latter to be shifted to the extreme right, viewing Figure 3, or the wide-open position, admitting cold fresh air to the unit, which will be driven entirely through the heating chamber and heated and projected into the room in a vertical jet. This condition will be maintained throughout the day, unless outside atmospheric conditions change to a rising temperature, in which event the air passing into and through the radiator will be of rising temperature causing the sylphon motor 33 to act upon the mixing damper to draw the same from its extreme right-hand position into the space between extremes, thus permitting some of the fresh air drawn into the unit to by-pass the heater and mix with the heated air in the mixing chamber 42 at the top of the unit before being discharged into the room. The temperature of the air, as thus mixed, will be lower than that previously discharged into the room, and the mixing damper will continue to operate between extremes sensitively and thus maintain the proper degree of temperature of the air discharged into the room. In the meantime, the inlet damper is retained open because the temperature of the room operates upon the thermal controlling device 69 to maintain the circuit to the solenoid, thus holding the recirculating damper at its right-hand position, viewing Figure 3. On the other hand, should the temperature of the outside air change suddenly to lowering degrees, thus making it harder to heat and causing a continual drop of temperature in the room, the sylphon 33 will shift the mixing damper to the extreme right and maintain it there, while the decreased temperature in the room will control the thermal device 69 and cause it to operate upon the switch 70, thus opening the circuit to the solenoid and allowing the springs, normally controlling the action of the inlet damper, to swing the latter to its closed position, at the back of the unit, thus entirely preventing the admission of cold air. This, with the maintenance of pressure on the radiators, will quickly cause a rise in temperature because the unit will be recirculating the air of the room, and this condition will continue until the temperature in the room has reached the predetermined maximum, whereupon the thermal controlling device 69 will operate again to close the switch 70, energize the solenoid, and cause its armature to shift the inlet damper 19 through the connecting mechanism to wide-open position, Figure 3, thus admitting the cold air to the unit again, the temperature of which will be controlled, as previously described, by the operation of the mixing damper, thus maintaining the proper predetermined temperature in the room, subject to radical changes such as previously described. To cooperate with the sylphon 33 in the control of the mixing damper 34, I may provide springs 34* surrounding the hinge, or pivot rod, of the damper, said springs tending to normally hold the damper in its position at the front of the unit. This normally closes the by-pass chamber to the passage of cold air. When the sylphon, by surrounding temperature, is caused to relax its pull upon the damper 34, by contraction of its bellows member, its "bleeding" action is aided by both the spring 82 and the two springs 34*, enabling the damper to respond quickly to changing atmospheric conditions.

The sensitive operation of the thermal controlling device 69, by the surrounding temperature is due to the fact that the blowers constantly draw the surrounding air into the unit through the slots 66 and 63 in the casing, the intervening thermal bulb or tube 67 thus getting the full effect of changing atmospheric conditions surrounding the unit.

From the foregoing it will be seen that my heating and ventilating unit is automatic in its operation with reference to every function to be performed by it, and it will also be seen that the desired temperature is maintained in the room during the normal day's run, and that when pressure on the radiator is reduced, the unit will automatically adjust itself to the changed internal conditions both of reduction and rise of pressure on the radiator. By placing the fan-motor and the solenoid in independent circuits, the motor and fans may be shut down to accommodate atmospheric conditions (allowing gravital recirculation) or to economize current; but, the solenoid will always be connected to the mains of the generator for operation when room conditions of temperature require the same.

Stress is laid upon the location of the filter below the motor and blower chamber and between the latter and the fresh air inlet. The location of the filter, as described, makes it possible to clean the air before being drawn into and discharging into the heating chamber, blower chamber and intermediate chamber, regardless of where the air is taken from, viz., the outside of the building or the inside of the room. In either event, the air is cleaned and filtered before being carried into the other functional parts of the unit. The location of the filter in my unit is also advantageous because it is readily accessible and can be placed and removed with great facility, no other parts of the unit being disturbed for the purpose of either removal or replacement. It is only necessary to remove the front plate of the casing and draw the filter outwardly on its supports.

Having thus described my invention, what I claim and desire to secure by Letters Patent is:

1. A heating and ventilating unit having recirculating means including a damper and mechanical means for actuating the same, a motor and blowers actuated thereby, a source of electric energy for actuating the motor, a shunt circuit including a solenoid and a thermostatic device, means operated by the thermostatic device for opening and closing the shunt circuit, and mechanical means between the solenoid and the damper for actuating the latter.

2. A heating and ventilating unit having means for controlling the temperature of air driven therefrom, and means for the admission of fresh air thereto and for recirculating the air in the room of installation of the unit through the latter, electrical means for controlling the action of the fresh air admission means, thermal means for controlling the electrical means, and independent thermal means for actuating the temperature controlling means.

3. A heating and ventilating unit having a chamber in which are mounted a motor and blowers, the latter being of centrifugal type, an inlet chamber below the motor and blower chamber, a damper pivotally mounted in the inlet chamber for controlling the functions of the latter, an opening in the casing leading to the motor and blower chamber, and means for actuating the damper including a thermostatic device mounted in the motor and blower chamber, and susceptible to changes in temperature of the air surrounding the unit and drawn into the motor and blower chamber by the blowers thereof.

4. A heating and ventilating unit comprising a casing having a combined inlet and recirculating damper, and means for actuating the same including an electric circuit, a solenoid inserted in the circuit, a switch also inserted in the circuit, and thermostatic means for controlling the switch to open and close the circuit, said thermostatic means including a bulb mounted on the outside of the casing, and fluid means for actuating the switch.

5. A heating and ventilating unit comprising a casing having means for recirculating the air therethrough, said means including air delivery means at the top of said casing, air inlet means at the bottom of said casing including a damper; mechanical means for actuating the damper, a solenoid for actuating the mechanical means, an electric circuit including the solenoid, an opening in the casing for the admission of air, and means arranged in the path of travel of the air into the unit through said opening for controlling the opening and closing of the solenoid circuit.

6. A heating and ventilating unit comprising a rectangular casing having its interior partitioned to provide a fresh air inlet chamber at its bottom; a motor and blower chamber located above the inlet chamber; a cold air chamber located above the motor and blower chamber; a damper operating in the cold air chamber; a temperature controlling motor controlling the damper operating in said cold air chamber; a heating chamber located above the cold air chamber; and a mixing chamber located above the heating chamber, the casing having a discharge outlet at its top and a bypass beside the heating chamber and communicating with the cold air chamber and mixing chamber.

7. A heating and ventilating unit having recirculating means comprising a damper adapted to control the inlet and recirculation of air to and through the unit, and means for actuating the damper including an electric circuit, a solenoid connected in the circuit, mechanical means between the solenoid and the damper, an opening in the casing for the admission of air thereto, and thermostatic means arranged in the path of travel of the air into the unit through said opening for controlling the operation of the solenoid.

8. A heating and ventilating unit having a combined inlet and recirculating damper, and means for actuating the same including an electric circuit, a solenoid inserted in the circuit, a switch inserted in the circuit, an opening in the casing for the admission of air thereto, and thermostatic means arranged in the path of travel of the air into the unit through said opening for controlling the switch to open and close the circuit.

MICHAEL J. CALLAHAN.